United States Patent [19]

Haftmann et al.

[11] Patent Number: 5,013,170

[45] Date of Patent: May 7, 1991

[54] PLASTIC PLATEN FOR TYPEWRITERS OR SIMILAR OFFICE EQUIPMENT

[75] Inventors: Johannes Haftmann, Schwabach; Rudolf Schmeykal, Hemhofen, both of Fed. Rep. of Germany

[73] Assignee: TA TRIUMPH ADLER Aktiengesellschaft, Nuremberg, Fed. Rep. of Germany

[21] Appl. No.: 312,519

[22] Filed: Feb. 21, 1989

[30] Foreign Application Priority Data

Feb. 19, 1988 [DE] Fed. Rep. of Germany ....... 3805215

[51] Int. Cl.⁵ .......................................... B41J 11/04
[52] U.S. Cl. ................................... 400/659; 400/661; 400/662; 264/45.5; 264/46.7
[58] Field of Search ............... 264/45.5, 46.7, 46.9; 400/659, 661, 661.1, 661.2, 661.3, 662, 641; 428/71, 318.6, 318.8

[56] References Cited

U.S. PATENT DOCUMENTS

| | | | |
|---|---|---|---|
| 2,594,348 | 4/1952 | Rockoff | 428/318.6 |
| 2,811,236 | 10/1957 | Ascoli | 400/659 |
| 3,480,127 | 11/1969 | Hesse et al. | 400/661.3 |
| 3,898,360 | 8/1975 | Neumann et al. | 428/318.8 |
| 3,981,496 | 9/1976 | Jensen et al. | 400/641 |
| 4,071,591 | 1/1978 | Kobayashi et al. | 264/45.3 |
| 4,186,162 | 1/1980 | Daley | 264/46.6 |
| 4,435,523 | 3/1984 | Ponzielli | 264/45.5 |
| 4,473,516 | 9/1984 | Hunerberg | 264/45.1 |
| 4,583,272 | 4/1986 | Keller | 400/659 |
| 4,707,408 | 11/1987 | Iwasawa et al. | 428/379 |
| 4,749,296 | 6/1988 | Bohmer | 400/659 |

FOREIGN PATENT DOCUMENTS 0062140 10/1982 European Pat. Off. ............ 400/659

Primary Examiner—Robert A. Dawson
Assistant Examiner—Allan R. Kuhns
Attorney, Agent, or Firm—Browdy and Neimark

[57] ABSTRACT

A method of producing platens for typewriters and similar office equipment. Conventional platens often include a large number of individual parts and are relatively expensive because of their high assembly and finishing costs. According to the invention, an impact-resistant polyolefin with the addition of a delayed-reacting foaming agent is employed in an injection molding process in such a fashion that, by means of differential cooling of the mold, the material on the platen surface and in areas of other functional elements such as line-advance wheel/notched wheel combinations hardens, while the core of the platen remains a foam. The process allows platens with other functional elements molded to them to be manufactured from a single material in a single operation and without any additional work, despite different demands made on the print backing and the other functional elements.

5 Claims, 1 Drawing Sheet

PLASTIC PLATEN FOR TYPEWRITERS OR SIMILAR OFFICE EQUIPMENT

FIELD OF THE INVENTION

The invention relates to a method for producing a plastic platen for typewriters and similar office equipment, where the platen consists of a compact outer layer and a foam core.

BACKGROUND OF THE INVENTION

Because they must meet widely differing construction requirements, platens for office equipment represent components which are relatively complicated and thus expensive. Traditionally, a platen is built up of a roller-shaped core consisting of a metal or plastic tube to which a bearing axle or at least axle stubs made of metal are coaxially attached. A cover, usually of rubber, is placed on the core and, in order to obtain sufficient surface exactitude and the correct surface properties, this cover is ground. To produce the desired movement of the platen or its ratchet, the bearing axle often has a so-called line-advance wheel/notched wheel combination mounted rigidly on the axle; a line-advance occurs when a pawl on the machine grips the line-advance wheel and rolls the platen by at least a partial line. The platen is held in the position to which the line-advance pawl acting on the line-advance wheel moves it, by a spring-mounted ratchet stud fixed to the machine body and gripping the ratchet. Such line-advance wheel/notched wheel combinations may be present at both ends of the platen so that it can be rolled both forward and backward. To roll the platen by hand, a platen turning wheel is fixed to at least one side of the bearing axle.

In order to obtain an acceptable acoustic performance from platens of the above type, the tube forming the core is either subdivided by stays or filled with various materials. In order to simplify the complicated construction of the platen, or at least its production, it has already been suggested in German Patent 15 61 267 to spray a bearing axle with plastic in such a way as to produce a roller-shaped core, on one end of which a line-advance wheel has been molded. The surface of the roller-shaped base is then covered with a rubber cover and its interior is divided into chambers by dividers running along the inside of the bearing axle.

While such a platen is much more simply and easily constructed than those of the traditional form described above, it still requires a rubber cover in order to produce an acceptable print background.

From German Published, Non-examined Patent Application DE 36 07 415, a platen for office equipment consisting of an axle with a platen body made of polyurethane resin mounted on it is known. The platen body is formed by the integral foam method in such a manner that the innermost foam layer gradually merges into the outer, compact surface layer, with no obvious divisions. With the corresponding setting of the material, the platen can supposedly also be used as a pressure roller in typewriters and similar office equipment.

Such platens do have surface properties which are roughly similar to those of platens with a rubber cover. However, the polyurethane resin used does not allow parts subject to wear, such as line-advance wheels, ratchets, etc. to be molded in one piece with the platen. In addition, this material does not lend itself to applications in areas of heavy or continuous use, since its properties would lead one to expect a destruction of its surface.

SUMMARY OF THE INVENTION

Avoiding the above drawbacks of known platens, it is therefore an object of the invention to describe a method for producing platens which allows the platen to be manufactured together with other functional elements in a single operation and from the same materials, preferably as a single unit. In addition to this, it is a further object to describe particularly advantageous designs for platens produced according to the preferred embodiment.

This object is attained in accordance with the method of adding a delayed reaction foaming agent to an impact resistant polyolefin and through partially differentiated cooling of the mold, processing the polyolefin by the injection molding method such that the temporal reaction point of the foaming agent and the cooling effect at different points on the mold are timed with respect to one another so that, in the area of the platen surface, as well as in the area of at least one other functional element formed together with the platen in the same injection molding, the material hardens before the foaming agent reacts. Advantageous platen designs produced in accordance with the preferred method described above are characterized in the dependent claims. The advantage of the preferred method lies particularly in the fact that a platen can be manufactured together with other functional elements such as a line-advance wheel, notched wheel, bearing axle, gears or platen turning wheel, in a single operation, in such a way that the platen surface and the other functional parts, despite being manufactured of the same material, have material properties reflecting the various functions which they are required to perform.

Conventional platens often consist of a large number of individual parts and are relatively expensive because of their high assembly and finishing costs. Therefore, according to the present invention, an impact-resistant polyolefin with the addition of a delayed-reacting foaming agent is employed in an injection molding process in such a fashion that, by means of differential cooling of the mold, the material on the platen surface and in areas of other functional elements such as line-advance wheel/notched wheel combinations hardens, while the core of the platen remains a foam. The process allows platens with other functional elements molded to them to be manufactured from a single material in a single operation and without any additional work, despite different demands made on the print backing and the other functional elements.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which.

DETAILED DESCRIPTION OF THE PREFERRED EMBODIMENTS

Figure 1:
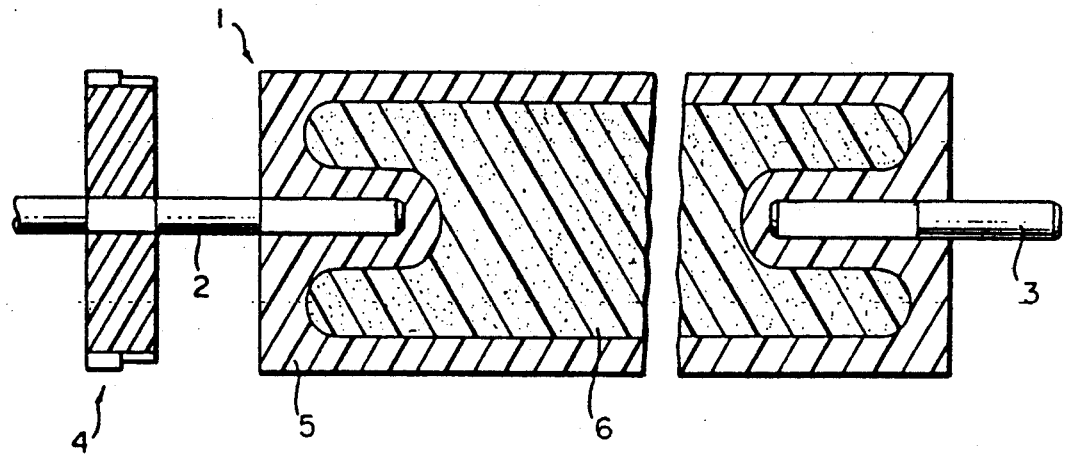
FIG. 1 is a sectional view of a platen with a line-advance wheel/notched wheel combination formed in the same operation.
Figure 2:
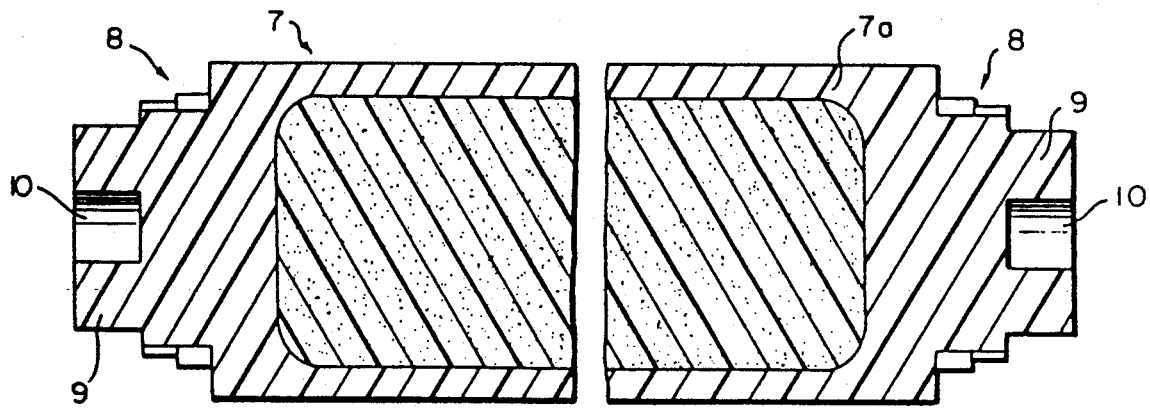
FIG. 2 is a sectional view of a platen with a line-advance wheel/notched wheel combination and internal bearings formed in the same operation.
Figure 3:
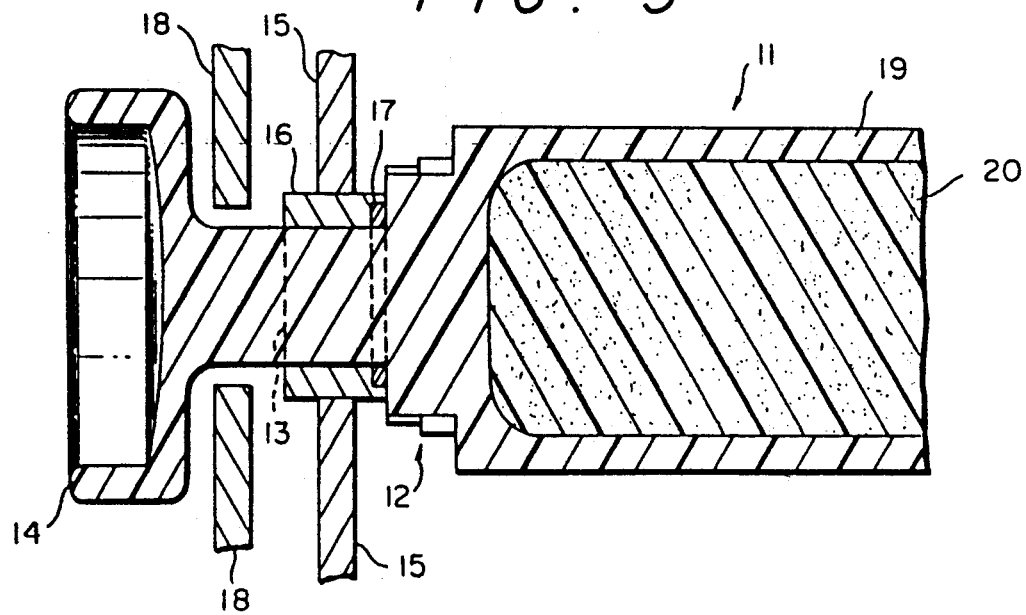
FIG. 3 is a cross-section of a platen with a line-advance wheel/notched wheel combination and platen turning wheel formed in the same operation.

Before the constructive details of the examples shown in FIG. 1 to 3 are more closely described, the manufacturing process for the platen will be discussed.

Using the thermoplastic foam method (TPF-method) to process thermoplastic plastics into parts generally known as structural foam form parts, is generally known in the plastics industry. Such processing of thermoplastic materials provides that the plastics, generally in granular form, are mixed with a foaming agent and, where necessary, with a coupling agent, whereby the proportion of foaming agent is dependent on the other material parameters or on the processing parameters.

Further processing of the plastic/foaming agent mixture is preferably carried out with injection equipment, specifically designed for the manufacture of structural foam form parts, which injects the plastic into molds once the foaming agent reaches reaction temperature.

The outer surface of TPF-form parts has a rough structure not unlike planed wood, because, while the incoming melt touches the entire inner surface of the mold, the gases released by the foaming agent prevent the mold walls from being completely coated by the melt. The cross-section of an average structural foam form part exhibits a relatively compact outer skin with a foamy core. Because of the surface structure described above, form parts manufactured by the TPF-method are particularly suited for use as housings. Their use as high-precision construction parts, such as platens for typewriters and similar office equipment, to which other functional elements such as line-advance wheel/notched wheel combinations can be molded is, however, not possible due to this surface structure. Because of the small number of gas bubbles on or near the surface, further processing is not effective.

Further testing has shown that form parts can be produced by the selection of a particular group of plastics and a corresponding setting of the processing parameters, the surface properties and cross-sectional structure and hardness properties of which differ from the above-described TPF-parts in such a manner that they can be used to manufacture platens for typewriters and similar office equipment without necessitating further processing.

The group of plastics mentioned above comprises impact resistant polyolefins, preferably, impact resistant polypropylene. Processing this material begins with the granular form of the plastic being mixed with a delayed-reaction foaming agent. The actual injection process is carried out with the standard equipment employed for the TPF-method, in such a way that the plasticised material is injected into the molds at a relatively high flow rate and the mold is cooled at differing rates, depending on the desired cross-sectional structure. Because of the delayed reaction of the foaming agent, and the cooling of the mold which is timed to coincide with this reaction, the inner wall of the mold is completely coated by the melt, producing a smooth surface on the form part and a cross-sectional structure which, on the rapidly cooled areas of the mold later forming functional parts such as the line-advance wheel/notched wheel combination, bearing axle, bearing seats coaxially formed on the platen, etc., contains no foam, while the platen itself, coming from a less quickly cooled area of the mold, has a completely sealed surface and a foam core. Because of the many parameters influencing the finishing process, no valid combination of cooling temperature, delay with respect to the reaction time of the foaming agent - and therefore its composition—or the processing temperature of the plastic, etc. can be given. The optimum combination of known foaming agents and relevant processing and cooling temperatures must be determined by experimentation. The same is true for the position of the molds, which must also be optimized by experimentation.

The selected material—impact resistant polypropylene—insures wear resistance in the areas of the above-mentioned functional elements, a smooth surface and, in connection with the foam structure in the area of the platen, sufficient elasticity, so that it is possible to form the platen in one operation, thus eliminating any further processing. The greater hardness of the platen in the impact area, when compared with conventional platens, allows the impression force to be greatly reduced while still retaining the same print clarity. This, in turn, will make the parts of a typewriter or printer which make the actual impression, less expensive. Polyolefin, because of its good sound-damping properties, also achieves a large reduction in printing noise. This reduction is enhanced by the internal foam structure of the platen and the reduction in impact force. Some exemplary embodiments of platens manufactured according to the method described above will be described in detail below.

FIG. 1 shows a platen 1 into which lateral axle stubs 2, 3 have been molded. Additionally, a line-advance wheel/notched wheel combination 4 is molded to the axle stub 2. In the region where the axle stubs 2, 3 enter the platen 1, they are knurled in order to insure that the axle stubs 2, 3 are rigidly fixed to the platen 1. In addition, the axle stub 2 is knurled in the area of the line-advance wheel/notched wheel combination 4, so that it is also rigidly fixed to the axle stub 2. The sectional view clearly shows that, along its surface and at its ends, as well as in the areas where the axle stubs 2, 3 enter it, the platen 1 has a compact skin 5, while the core 6 is foam. The line-advance wheel/notched wheel combination 4 consists entirely of compact material with no foam structure.

The above-described platen 1 is produced in the previously described manner in such a way that the parts forming the surface of the platen 1 are cooled less than those forming the axle stubs 2, 3 and the line-advance wheel/notched wheel combination 4.

Another embodiment, also in sectional view, is shown in FIG. 2. A line-advance wheel/notched wheel combination 8 is molded to both ends of a platen 7 which also has shaped sections 9 in which bearing seats 10 have been molded coaxially to the platen 7. As the sectional view clearly shows, the area of the platen 7 which serves as print backing is internally foamy as the result of less cooling of this piece, and has a compact skin along its surface 7a. The ends of the platen 7 which are molded as line-advance wheel/notched wheel combinations 8 and bearing seats 9, 10 have, because of the greater amount of cooling applied to them during the manufacturing process, a completely compact structure and are therefore sufficiently wear-resistant to perform the functions for which they have been designed. It should be noted that the platen is mounted in the typewriter by bearing necks on the typewriter body (not shown) extending into the recesses 10. In order to prevent axial play and at the same time reduce friction, wearing rings (not shown) may be fixed to either the platen or the typewriter body.

The advantage of this platen concept is that the platen and various other functional elements can be produced as a unit in a single operation. In this way, the manufacturing process can be completely automated.

Finally, FIG. 3 is also a sectional view of a platen 11 which, in addition to a line-advance wheel/notched wheel combination 12, has a bearing axle 13 molded to it and a platen turning wheel 14 molded, in turn, to the axle. The bearing axle 13 is locked into a separable bearing 16 containing a wearing ring 17 and mounted to a rack 15 in the typewriter, and, with the platen turning wheel 14 mounted to it, extends through the housing 18 of the typewriter. Here too, the sectional view clearly shows that the outer area 19 of the platen 11, which serves as print backing, has a compact skin as the result of less cooling of this portion of the mold during manufacture, and that the core 20 is foamy. The ends of the platen 11 with the line-advance wheel/notched wheel combination 12 and the bearing axle 13 and platen turning wheel 14 molded to it have, because of the greater amount of cooling applied to this area of the mold during the manufacturing process, a compact structure and are therefore also sufficiently wear-resistant to perform the functions for which they have been designed.

The right side of the platen not shown in FIG. 3 can also be fitted with a line-advance wheel/notched wheel combination with a bearing axle attached to it, or, it can be formed in accordance with the example in FIG. 2. Mounting takes place accordingly.

Naturally, the functional elements mentioned in connection with FIG. 1 to 3 are merely examples. Other functional elements such as gears connected to a drive within the machine, or gears attached to an externally placed paper feed also come to mind. Use of the above-described method for producing platens makes it possible for the first time to manufacture platens and other, relevant, functional parts such as line-advance wheel/notched wheel combinations, bearing axles, platen turning wheels, etc. in a single operation and preferably entirely of plastic, regardless of the differing demands made on the parts. Beyond this, because of the exactness of the process and the surface properties of the product, no further processing is required. In particular, the mounting of a rubber cover as occurs in the manufacture of conventional platens, becomes unnecessary, as the cross-sectional structure of a foam core covered with a compact, outer skin which the production process achieves, can be used directly as a printer backing, whereby, as was described above, the force of the printing system, that is, the kinetic energy with which the type strikes the platen, can be greatly reduced without affecting the quality of the print. This circumstance not only reduces the cost of the printing system, but also reduces the print noise level.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A platen for a typewriter or similar office equipment, comprising:
    a compact outer covering of cylindrical configuration formed of an impact resistant polyolefin containing an unexpanded foaming agent;
    a foam core formed of expanded impact resistant polyolefin, said foam core being integral and unitary with said compact covering; and
    first and second compact end portions substantially entirely covering said foam core, said end portions being formed of impact resistant polyolefin containing unexpanded foaming agent, said end portions being continuous with said compact outer covering and being integral and unitary with said compact outer covering and said foam core;
    said compact outer covering, said compact end portions and said foam core being injection molded in one step; and
    at least one of a line advance wheel and a notch wheel integrally injection molded together with said platen.

2. A platen for a typewriter or similar office equipment, comprising:
    a compact outer covering of cylindrical configuration formed of an impact resistant polyolefin containing an unexpanded foaming agent;
    a foam core formed of expanded impact resistant polyolefin, said foam core being integral and unitary with said compact covering; and
    first and second compact end portions substantially entirely covering said foam core, said end portions being formed of impact resistant polyolefin containing unexpanded foaming agent, said end portions being continuous with said compact outer covering and being integral and unitary with said compact outer covering and said foam core;
    said compact outer covering, said compact end portions and said foam core being injection molded in one step;
    axle stubs extending outwardly from said end portions, said axle stubs being performed and united with said platen during injection molding thereof, said end portions comprising anchoring means for rigidly fixing said axle stubs to said unitary outer covering, foam core and end portions; and
    a line-advance wheel/notch wheel combination injection molded to one of said axle stubs.

3. A platen for a typewriter or similar office equipment, comprising:
    a compact outer covering of cylindrical configuration formed of an impact resistant polyolefin containing an unexpanded foaming agent;
    a foam core formed of expanded impact resistant polyolefin, said foam core being integral and unitary with said compact covering; and
    first and second compact end portions substantially entirely covering said foam core, said end portions being formed of impact resistant polyolefin containing unexpanded foaming agent, said end portions being continuous with said compact outer covering and being integral and unitary with said compact outer covering and said foam core;

said compact outer covering, said compact end portions and said foam core being injection molded in one step;

wherein said end portions are each molded to a shape defining a cavity for receiving a bearing.

4. A platen for a typewriter or similar office equipment, comprising:

a compact outer covering of cylindrical configuration formed of an impact resistant polyolefin containing an unexpanded foaming agent;

a foam core formed of expanded impact resistant polyolefin, said foam core being integral and unitary with said compact covering; and first and second compact end portions substantially entirely covering said foam core, said end portions being formed of impact resistant polyolefin containing unexpanded foaming agent, said end portions being continuous with said compact outer covering and being integral and unitary with said compact outer covering and said foam core;

said compact outer covering, said compact end portions and said foam core being injection molded in one step;

wherein each said end portion comprises an integrally injection molded axially extending bearing axle.

5. A platen according to claim 4 wherein at least one said integrally molded bearing axle comprises a platen turning wheel integrally molded thereto.

* * * * *